United States Patent
Pezeshki et al.

(10) Patent No.: US 12,464,317 B2
(45) Date of Patent: *Nov. 4, 2025

(54) USER EQUIPMENT INDOOR/OUTDOOR INDICATION

(71) Applicant: QUALCOMM Incorporated, San Diego, CA (US)

(72) Inventors: Hamed Pezeshki, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/428,436

(22) Filed: Jan. 31, 2024

(65) Prior Publication Data
US 2024/0171945 A1 May 23, 2024

Related U.S. Application Data

(63) Continuation of application No. 17/388,221, filed on Jul. 29, 2021, now Pat. No. 11,937,148.
(Continued)

(51) Int. Cl.
*H04W 4/029* (2018.01)
*G01S 5/00* (2006.01)
(Continued)

(52) U.S. Cl.
CPC ............ *H04W 4/029* (2018.02); *G01S 5/015* (2020.05); *G06F 18/214* (2023.01); *G06V 20/00* (2022.01); *H04W 4/38* (2018.02)

(58) Field of Classification Search
CPC ....... H04W 4/00–029; H04W 4/30–48; H04W 8/00–18; H04W 88/00–06; G06V 20/00; G06F 18/214
See application file for complete search history.

(56) References Cited

U.S. PATENT DOCUMENTS 8,868,141 B2  10/2014  Subramanian et al.
9,584,966 B1  2/2017  Thiel et al.
(Continued)

FOREIGN PATENT DOCUMENTS

CN  103856989 A  6/2014
CN  104185225 A  12/2014
(Continued)

OTHER PUBLICATIONS

International Preliminary Report On Patentability—PCT/US2021/044094—The International Bureau of WIPO—Geneva, Switzerland—Feb. 9, 2023.
(Continued)

*Primary Examiner* — San Htun
(74) *Attorney, Agent, or Firm* — QUALCOMM Incorporated

(57) ABSTRACT

A method of indicating user equipment (UE) status, the method comprising: determining, at the UE based on at least one of sensor output information of the UE or one or more incoming wireless signals to the UE, an indoor/outdoor status of the UE; transmit, via at least one transmitter, an indoor/outdoor indication message to a network entity, wherein the indoor/outdoor indication message reports the indoor/outdoor status of the UE to the network entity, and the network entity is a base station, or a server, or both; receiving, via at least one receiver, a control information message from the network entity in response to the indoor/outdoor indication message; and changing operation of the UE based on the control information message.

20 Claims, 10 Drawing Sheets

Related U.S. Application Data

(60) Provisional application No. 63/058,648, filed on Jul. 30, 2020.

(51) Int. Cl.
    *G06F 18/214*     (2023.01)
    *G06V 20/00*     (2022.01)
    *H04W 4/38*     (2018.01)

(56) References Cited

U.S. PATENT DOCUMENTS

| | | | |
|---|---|---|---|
| 10,440,712 B1* | 10/2019 | Fang | H04W 72/0453 |
| 11,153,720 B1 | 10/2021 | Newton et al. | |
| 2002/0198977 A1 | 12/2002 | Cho | |
| 2006/0109110 A1 | 5/2006 | Hill et al. | |
| 2014/0135040 A1* | 5/2014 | Edge | G01C 5/06 |
| | | | 455/456.6 |
| 2014/0179298 A1 | 6/2014 | Grokop et al. | |
| 2014/0334264 A1 | 11/2014 | Thaker | |
| 2015/0016412 A1 | 1/2015 | Horn et al. | |
| 2016/0029224 A1 | 1/2016 | Edge | |
| 2016/0195602 A1 | 7/2016 | Meadow | |
| 2016/0234644 A1* | 8/2016 | Belghoul | G01S 5/0236 |
| 2016/0337888 A1 | 11/2016 | Zhang et al. | |
| 2017/0054615 A1* | 2/2017 | Wilson | H05B 47/155 |
| 2017/0086024 A1* | 3/2017 | Do | H04W 74/002 |
| 2019/0090096 A1 | 3/2019 | Ivanov et al. | |
| 2019/0362738 A1 | 11/2019 | Mei | |
| 2021/0176726 A1 | 6/2021 | Vyunova et al. | |
| 2022/0038861 A1 | 2/2022 | Pezeshki | |

FOREIGN PATENT DOCUMENTS

| | | |
|---|---|---|
| CN | 106842267 A | 6/2017 |
| CN | 108366341 A | 8/2018 |
| CN | 109254308 A | 1/2019 |
| CN | 113630713 A | 11/2021 |
| EP | 3438701 A1 | 2/2019 |
| EP | 3578154 A1 | 12/2019 |
| JP | 2007232592 A | 9/2007 |
| KR | 100619523 B1 | 9/2006 |
| KR | 20190112611 A | 10/2019 |
| WO | 2010086188 A1 | 8/2010 |
| WO | 2011083801 A1 | 7/2011 |
| WO | 2015054489 A1 | 4/2015 |
| WO | 2018049766 A1 | 3/2018 |

OTHER PUBLICATIONS

International Search Report and Written Opinion—PCT/US2021/044094—ISA/EPO—Nov. 23, 2021.

* cited by examiner

USER EQUIPMENT INDOOR/OUTDOOR INDICATION

CROSS-REFERENCE TO RELATED APPLICATIONS

This application is a continuation of U.S. patent application Ser. No. 17/388,221, filed Jul. 29, 2021, entitled "USER EQUIPMENT INDOOR/OUTDOOR INDICATION," which claims the benefit of U.S. Provisional Application No. 63/058,648, filed Jul. 30, 2020, entitled "USER EQUIPMENT INDOOR/OUTDOOR INDICATION." Both of these applications are assigned to the assignee hereof, and the entire contents of both of which are hereby incorporated herein by reference in their entireties.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

A user equipment (UE) is discussed. The UE may comprise: at least one transmitter; at least one of: at least one receiver configured to receive incoming wireless signals or at least one sensor configured to provide sensor output information; at least one memory; and at least one processor communicatively coupled to the at least one transmitter, to the at least one of the at least one receiver or the at least one sensor, and to the at least one memory, wherein the at least one processor is configured to: determine, based on at least one of the sensor output information or one or more of the incoming wireless signals, an indoor/outdoor status of the UE; transmit, via the at least one transmitter, an indoor/outdoor indication message to a network entity, wherein the indoor/outdoor indication message reports the indoor/outdoor indication status of the UE to the network entity, and the network entity is a base station, or a server, or both; receive, via the at least one receiver, a control information message from the network entity in response to the indoor/outdoor indication message; and change operation of the UE based on the control information message.

As an example, the UE may perform a method of indicating user equipment (UE) status. The method comprises: determining, at the UE based on at least one of sensor output information of the UE or one or more incoming wireless signals to the UE, an indoor/outdoor status of the UE; transmit, via at least one transmitter, an indoor/outdoor indication message to a network entity, wherein the indoor/outdoor indication message reports the indoor/outdoor status of the UE to the network entity, and the network entity is a base station, or a server, or both; receiving, via at least one receiver, a control information message from the network entity in response to the indoor/outdoor indication message; and changing operation of the UE based on the control information message.

As an example, the UE may comprise: means for determining, based on at least one of sensor output information or one or more incoming wireless signals, an indoor/outdoor status of the UE; means for reporting an indoor/outdoor indication of the indoor/outdoor status of the UE to a network entity, wherein the network entity is a base station, or a server, or both; means for receiving a control information message from the network entity in response to the indoor/outdoor indication; and means for changing operation of the UE based on the control information message.

DETAILED DESCRIPTION

Figure 1:
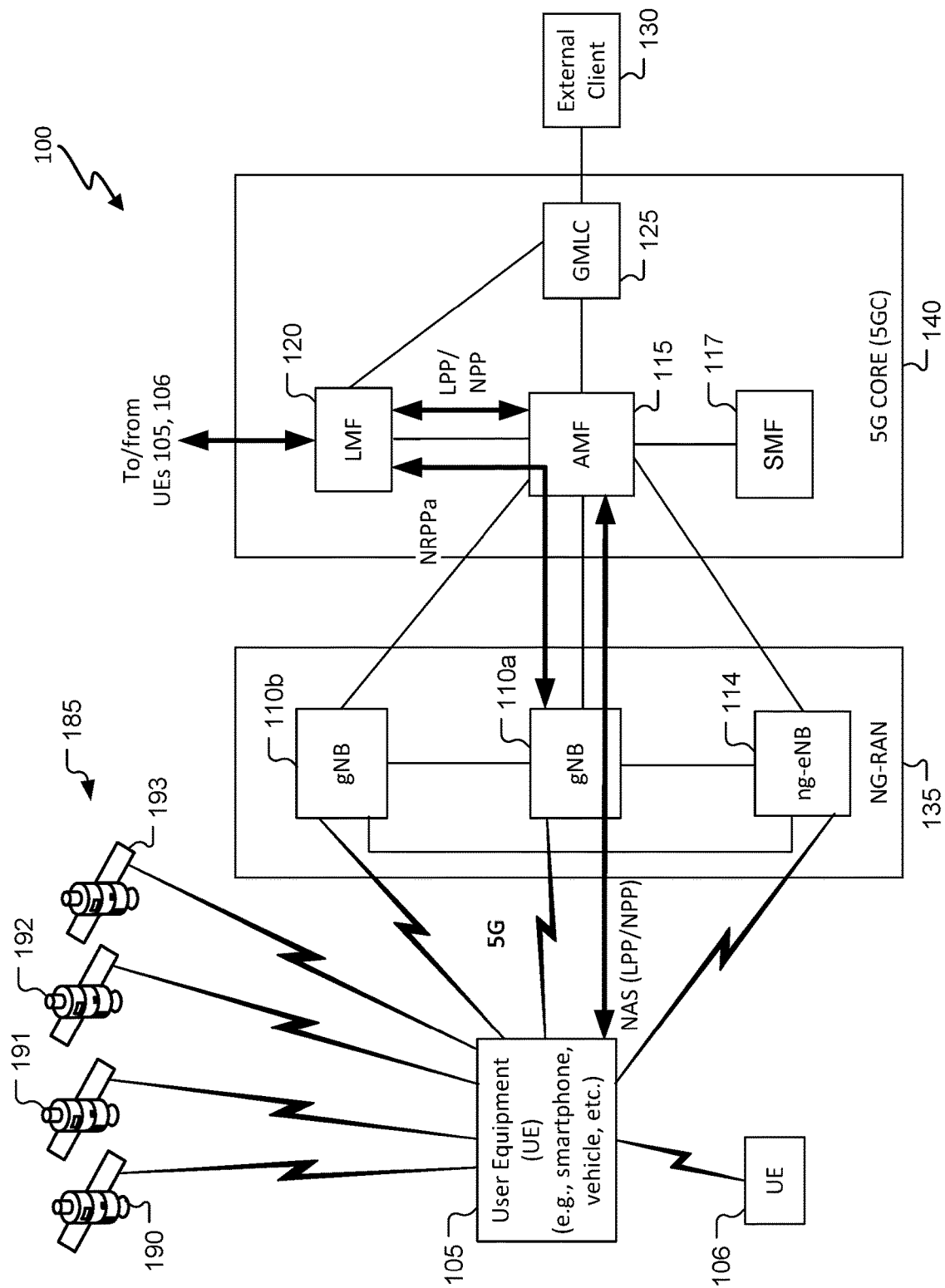
FIG. 1 is a simplified diagram of an example wireless communications system.

Techniques are discussed herein for determining, reporting, and using an indoor/outdoor status of a user equipment (UE). For example, the UE may use one or more sensor measurements and/or one or more positioning signal measurements and/or one or more communication signal measurements to determine whether the UE is indoors or outdoors. The UE may determine an expected, future indoor/outdoor status of the UE, e.g., using velocity of the UE, historical status of the UE, etc. The UE may use a machine-learning algorithm to determine the indoor/outdoor status. The UE may use the indoor/outdoor status to affect operation of the UE, e.g., a transmit power used by the UE. The UE may report the indoor/outdoor status to a network entity. The network entity may use the indoor/outdoor status to initiate one or more actions such as handover of the UE to a different serving base station, change of a beam used for communication with the UE, and/or sending a command to the UE to change the transmit power used by the UE for communication. Other configurations, however, may be used.

Items and/or techniques described herein may provide one or more of the following capabilities, as well as other capabilities not mentioned. Handover, beam management, and/or control of UE transmit power may be facilitated. Communication between a UE and a base station may be facilitated, and loss of communication data reduced. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
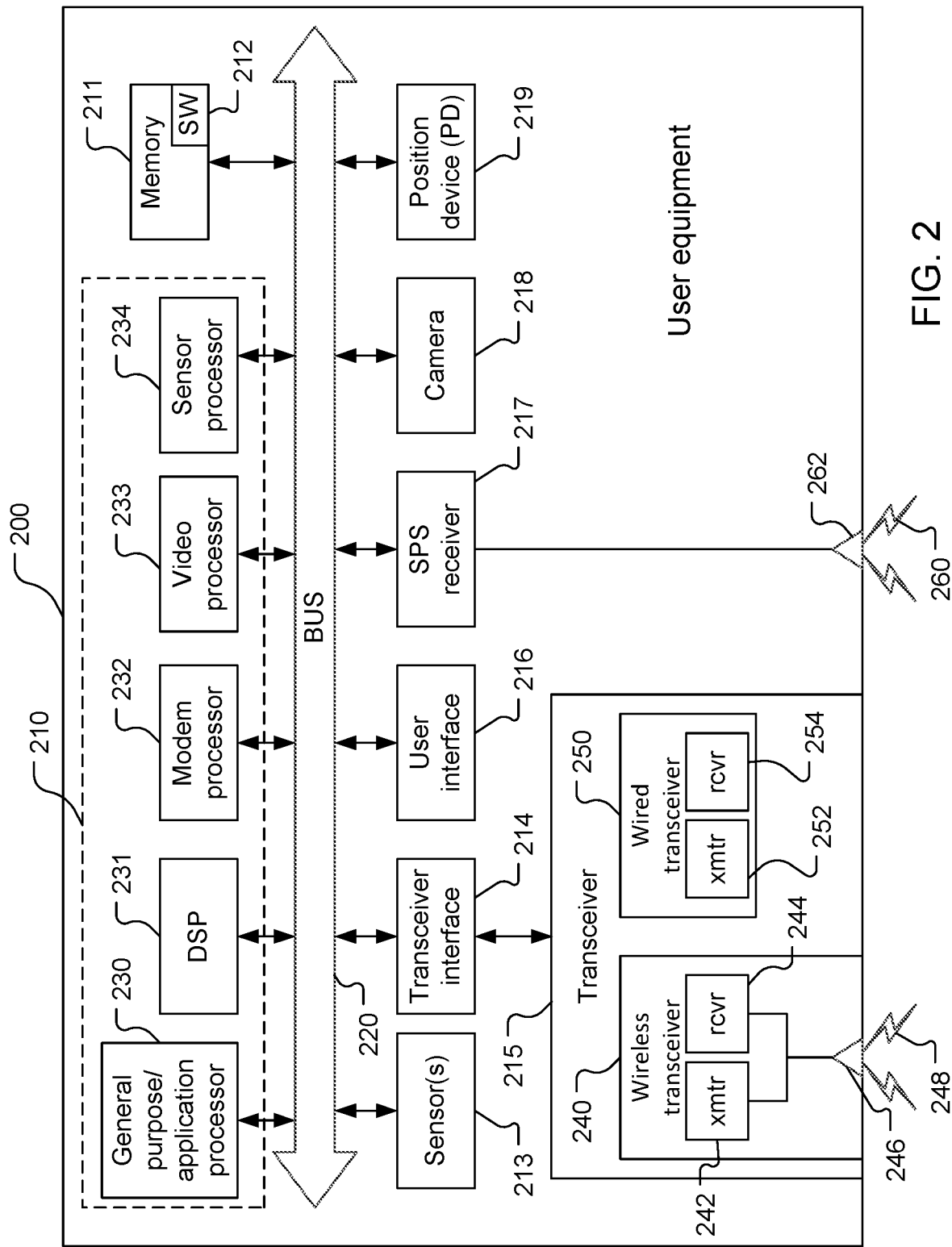
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
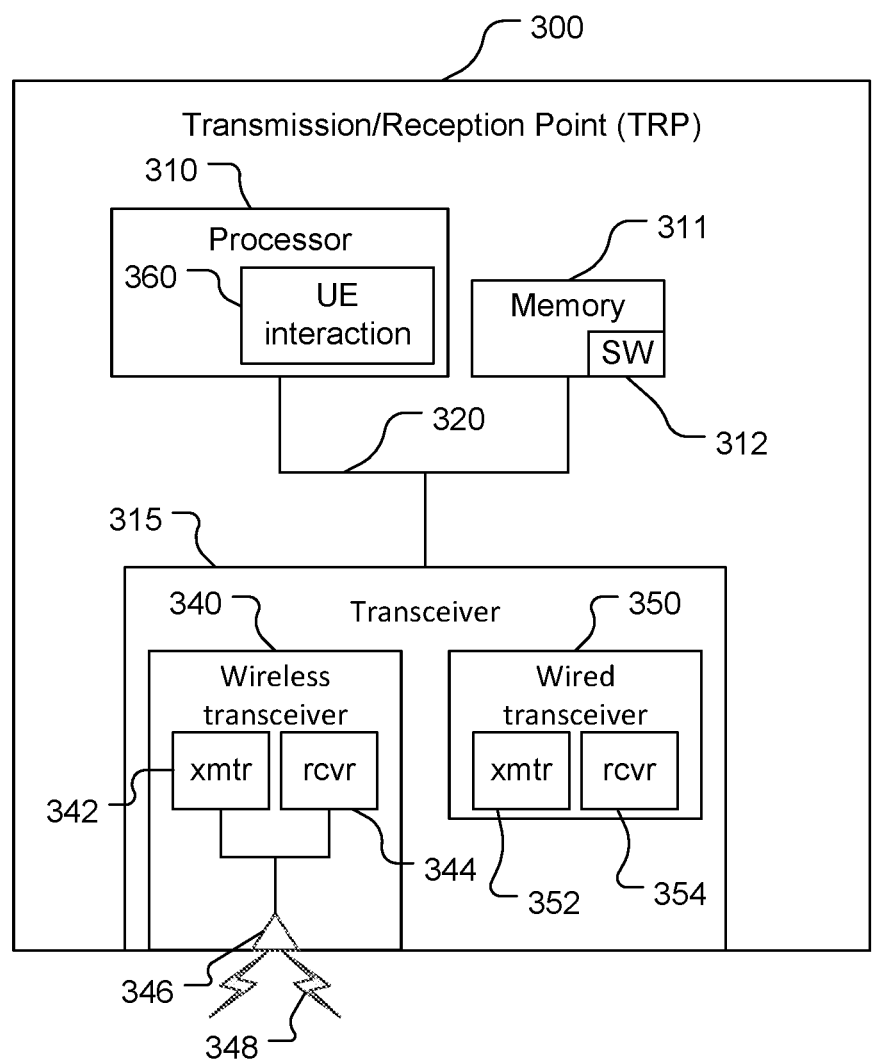
FIG. 3 is a block diagram of components of an example transmission/reception point.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
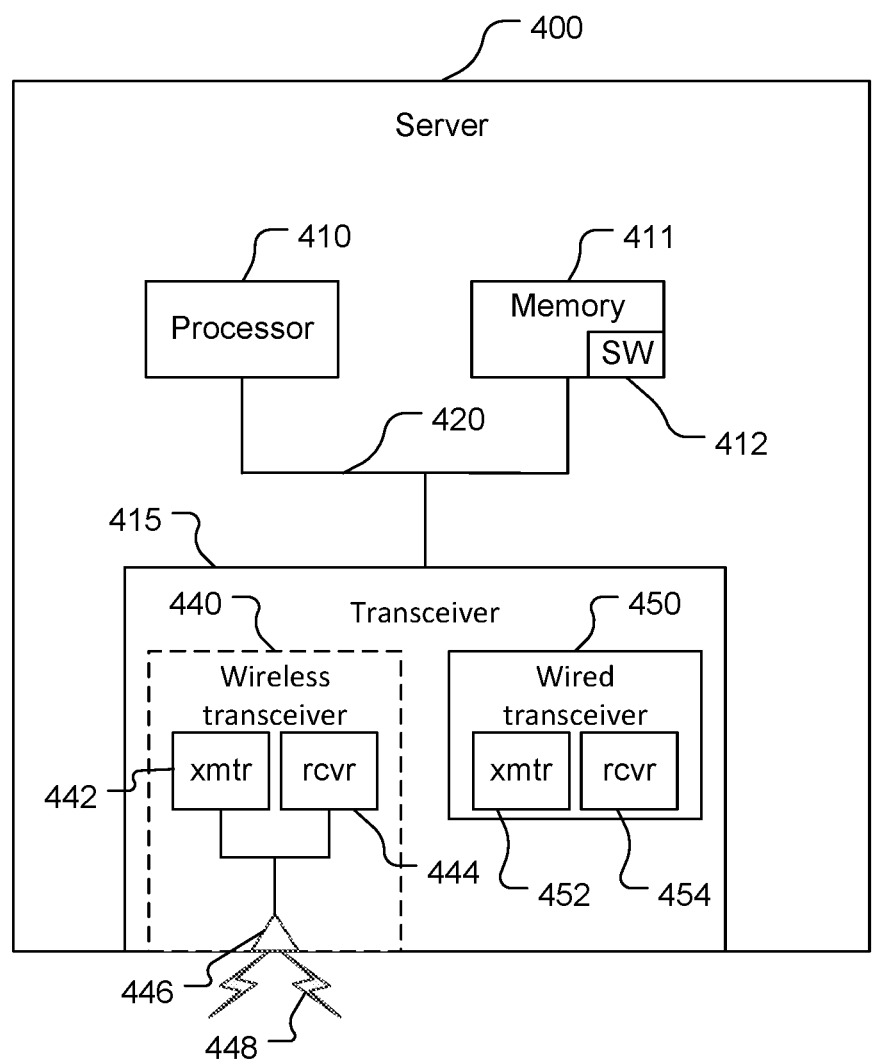
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-Positioning FrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Indicating Indoor/Outdoor Status

UEs may move between indoor regions, outdoor regions, and other regions, e.g., that may be ambiguous as to whether the region is indoors or outdoors. For example, indoor regions may be characterized by low signal strength of cellular base station signals and low signal strength of SPS signals (e.g., below respective indoor signal strength thresholds) while outdoor regions may be characterized by high signal strength of one or more cellular base station signals and/or high signal strength of one or more SPS signals (e.g., above respective outdoor signal strength thresholds). The outdoor signal strength thresholds may be higher than the respective indoor signal strength thresholds. Ambiguous regions may be characterized by one or more cellular base stations signals between indoor and outdoor base station signal strength thresholds and one or more SPS signals between indoor and outdoor SPS signal strength thresholds such that the region is indeterminate as to whether the region is indoors or outdoors. For example, indeterminate regions may include regions inside vehicles, tunnels, covered areas, urban canyons, etc.

Knowledge of whether a UE is in an indoor region or an outdoor region may be useful for a variety of reasons. For example, handover between an indoor base station to an outdoor base station or vice versa may be facilitated with this knowledge. As another example, beam management of a TRP may be improved with knowledge of an indoor/outdoor status of a UE (e.g., whether the UE is indoors or outdoors, or is expected to change indoor/outdoor status). As another example, power control of a UE may benefit from knowledge of indoor/outdoor status of the UE.

Referring again to FIG. 3, the description herein may refer only to the processor 310 performing a function, but this includes other implementations such as where the processor 310 executes software (stored in the memory 311) and/or firmware. The description herein may refer to the TRP 300 performing a function as shorthand for one or more appropriate components (e.g., the processor 310 and the memory 311) of the TRP 300 performing the function. The processor 310 (possibly in conjunction with the memory 311 and, as appropriate, the transceiver 315) includes a UE interaction unit 360. The UE interaction unit 360 may be configured to initiate handover of a UE in response to receiving an indication from the UE that the indoor/outdoor status of the UE has changed or is expected to change. As another example, the UE interaction unit 360 may initiate beam management, e.g., a change of beams used to communicate with the UE, in response to the indication from the UE that the indoor/outdoor status of the UE has changed or is expected to change. As another example, the UE interaction unit 360 may initiate power control of the UE, e.g., affecting a transmit power of the UE, in response to the indication from the UE that the indoor/outdoor status of the UE has changed or is expected to change.

Figure 5:
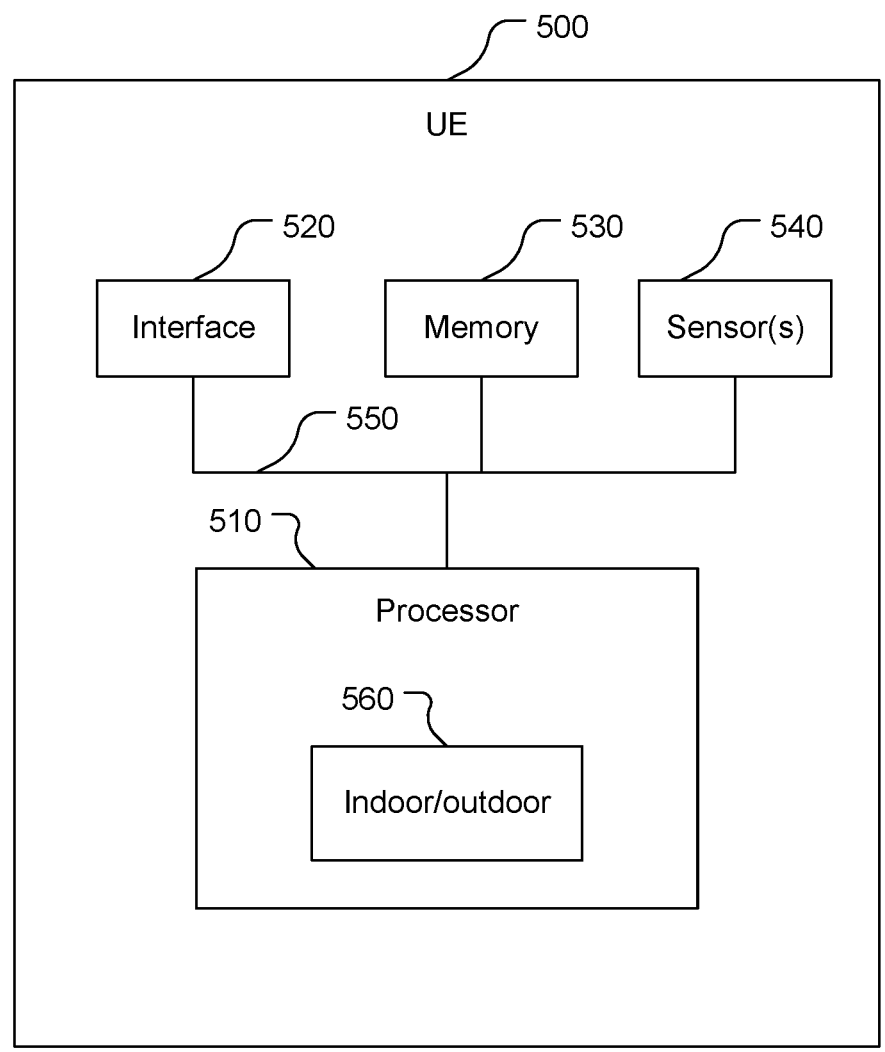
FIG. 5 is a simplified block diagram of an example user equipment.

Referring to FIG. 5, with further reference to FIGS. 1-4, a UE 500 includes a processor 510, an interface 520, a memory 530, and one or more sensors 540 communicatively coupled to each other by a bus 550. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions. The sensor(s) 540 may include one or more of the sensor(s) 213 and/or may include the camera 218.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes an indoor/outdoor unit 560. The indoor/outdoor unit 560 may be configured to determine whether the UE 500 is in an indoor region, in an outdoor region, or in an indeterminate region (e.g., a region that the indoor/outdoor unit 560 is not confident is an indoor region and the indoor/outdoor unit 560 is not confident is an outdoor region). The indoor/outdoor unit 560 may be configured to determine whether the UE 500 is expected to be in an indoor region in the future or in an outdoor region in the future. Functionality of the indoor/outdoor unit 560 is discussed further below, and the description may refer to the processor 510 generally, or the UE 500 generally, as performing any of the functions of the indoor/outdoor unit 560.

Figure 6:
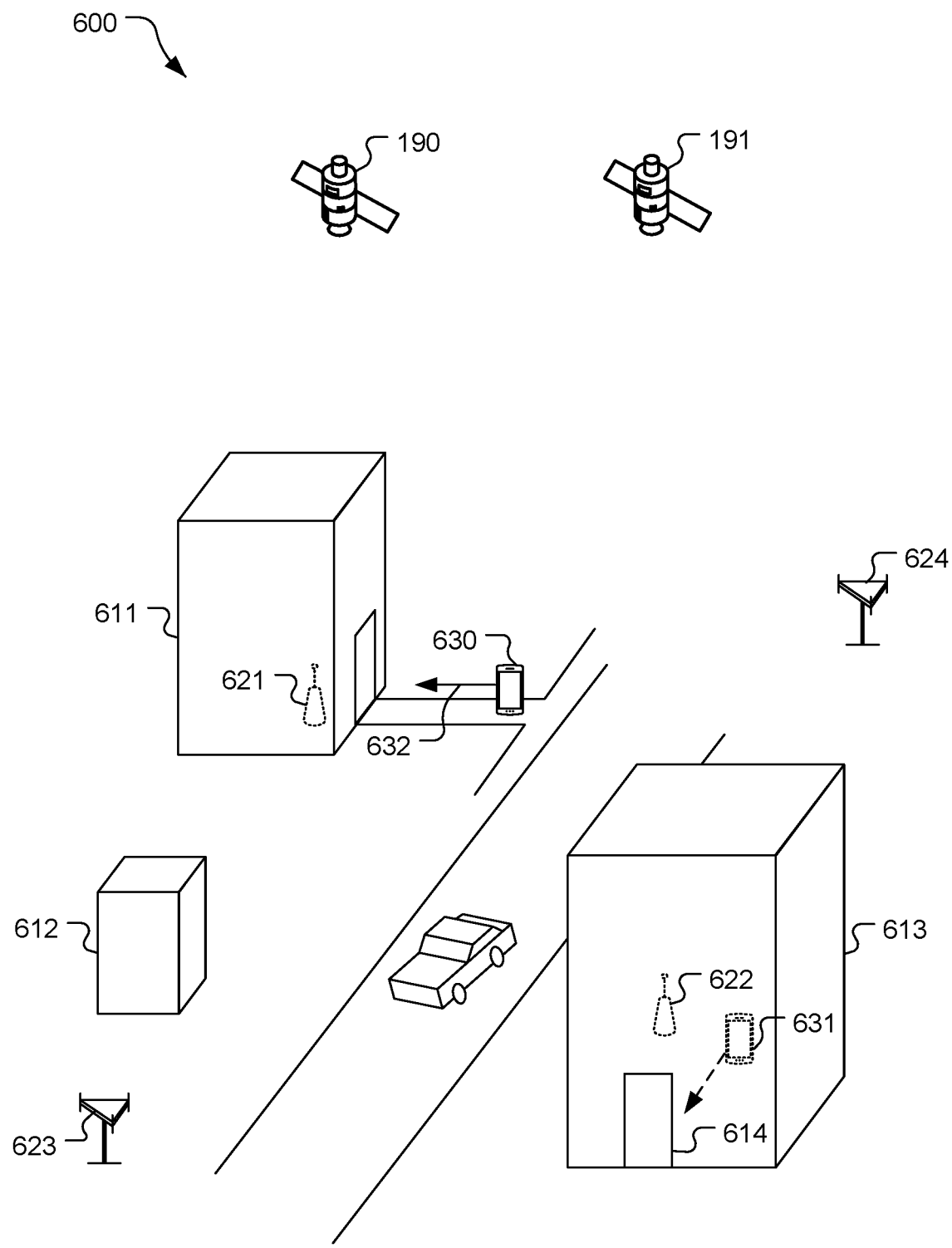
FIG. 6 is a simplified diagram of an environment with indoor and outdoor regions.

Referring also to FIG. 6, that shows an example environment 600 with indoor and outdoor regions, the indoor/ outdoor unit 560 may use information from the sensor(s) 540 and/or signals from the interface 520 to determine the indoor/outdoor status of the UE 500. For example, the processor 510 may cause the camera 218 to capture one or more images and may analyze the one or more images to determine whether the UE 500 is indoors, e.g., inside a structure such as a building 611, 612, 613, or outdoors, or is indeterminate (e.g., ambiguous). As another example, the processor 510 may analyze one or more wireless signals received via the antenna 246 and the wireless receiver 244 and/or via the antenna 262 and the SPS receiver 217. The processor 510 may determine that the UE 500 is in close proximity to a base station and determine the indoor/outdoor status of the UE 500 outdoors based on a known location of the base station. For example, if the UE 500 receives a signal from a base station 621 or a base station 622, each of which is known to be disposed indoors, with a received signal strength above a threshold value, then the indoor/outdoor unit 560 may conclude that the UE 500 is in the building 611 or the building 613, respectively. As another example, the indoor/outdoor unit 560 may determine that the UE 500 is outdoors in response to one or more signals received from one or more outdoor base stations 623, 624 and/or from one or more satellites 190, 191 being above respective threshold received power values. As another example, the processor 510 may determine a position of the UE 500 based on information from one or more of the sensor(s) 540 (e.g., for dead reckoning), one or more signals from one or more of the base stations 621-624, and/or one or more signals from one or more of the satellites 190, 191 (and/or one or more other entities) and determine the indoor/outdoor status of the UE 500 based on the determined position. For example, the processor 510 may determine the indoor/outdoor status of the UE 500 based on the position of the UE 500 and map information indicating locations of structures and/or locations and corresponding indoor/outdoor characteristics.

The indoor/outdoor unit 560 may use combinations of information to determine the indoor/outdoor status of the UE 500. The indoor/outdoor unit 560 may combine any of the information above, and/or other information, to help determine the status of the UE 500. For example, the indoor/outdoor unit 560 may use a position estimate of the UE 500 that could be indoors or outdoors and a received signal strength of an outdoor base station signal that is below an outdoor signal strength threshold but above an indoor signal strength threshold to conclude that the UE 500 is outdoors.

The indoor/outdoor unit 560 may be configured to implement a machine-learning algorithm to determine the indoor/outdoor status of the UE 500. For example, the processor 510 may execute an algorithm stored in the memory 530 using one or more inputs, e.g., sensor information from the sensor(s) 540 and/or signal measurement(s) from the interface 520. The machine-learning algorithm may provide an indoor/outdoor status classification output based on the one or more inputs. The classification accuracy may improve over time, and may be particularly useful in predicting future status, as discussed further below.

The indoor/outdoor unit 560 may determine that the indoor/outdoor status of the UE 500 is indeterminate (i.e., inconclusive). For example, the status may be determined to be indeterminate if the indoor/outdoor unit 560 is unable to determine, with at least a threshold level of confidence, that the UE 500 is either indoors or outdoors. For example, if received signal strengths from outdoor base stations are below an outdoor threshold signal strength for concluding the status is outdoors and above an indoor threshold signal strength for concluding the status is indoors, then the status may be determined as indeterminate. Indeterminate regions may have some signal attenuation preventing a confident determination of being outdoors, but less attenuation that may be typical of an indoor region. Examples of indeterminate locations may be vehicle interiors (e.g., cars, trains, etc.), dense urban canyons (e.g., between tall buildings), tunnels, covered patios, etc. These are examples only, and not limiting of the disclosure.

Figure 7:
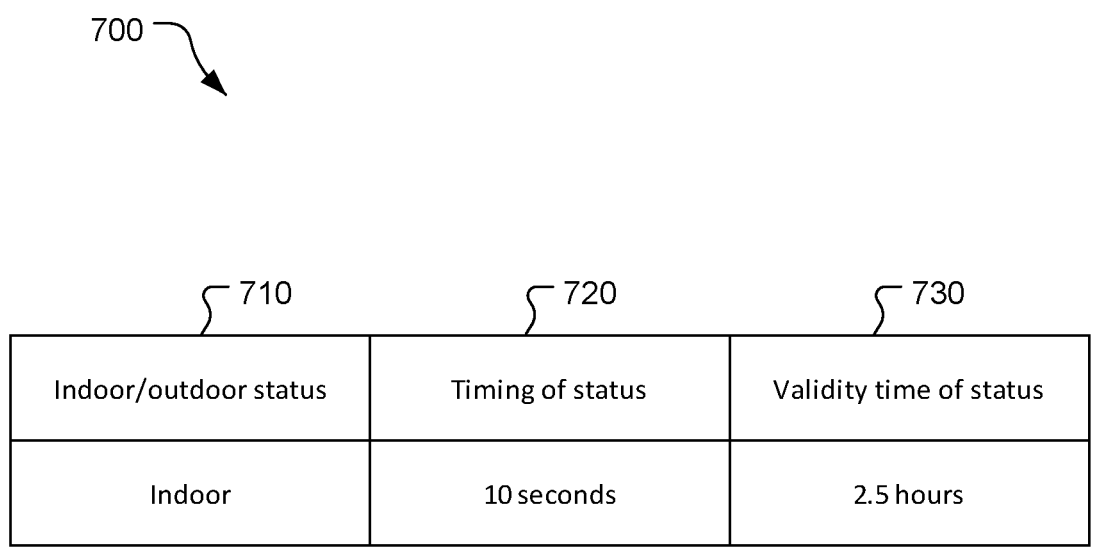
FIG. 7 is a simplified diagram of an example of an indoor/outdoor indication message.

Referring also to FIG. 7, an indoor/outdoor indication message 700 includes an indoor/outdoor status field 710, a timing of status field 720, and a validity time of status field 730. Either or both of the fields 720, 730 may be omitted from the message 700. The message 700 may be part of a larger message, e.g., an LPP message or an LPPe (LPP extended) message. For example, the UE 500 may use an LPPe message to report UE states such as walking, fidgeting, in pocket, on escalator, etc., and the message 700 may be included in the LPPe message. The indoor/outdoor status field 710 indicates the status of the UE 500 with respect to being indoors or outdoors. For example, the indoor/outdoor status field 710 may indicate that the UE is indoors, outdoors, or indeterminate as to being indoors or outdoors. The indoor/outdoor status field 710 may comprise two bits with coded meanings, e.g., 00 meaning indoors, 01 meaning outdoors, and 10 meaning indeterminate. Still other statuses may be indicated. The fields 720, 730 may indicate, respectively, when in the future the status indicated by the indoor/outdoor status field 710 will be valid, and a duration of validity of the status indicated by the value of the indoor/outdoor status field 710, absent a subsequent status indication.

The indoor/outdoor unit 560 may be configured to determine and indicate an expected, future indoor/outdoor status of the UE 500 as the indoor/outdoor status of the UE 500, e.g., using a combination of the indoor/outdoor status field 710 and the timing of status field 720. For example, with a UE 630 presently being outdoors and moving in a direction 632 toward the building 611, the indoor/outdoor unit 560 may determine that the UE 630 will be indoors at a future time, e.g., in 10 seconds. The determination of the future status may be based on one or more of a variety of factors, including a combination of factors, such as a present position of the UE 630, a direction and/or speed of travel of the UE 630, proximity of a building to the UE 630, historical status of the UE 630 (e.g., history of being indoors at the present time of day), etc. One or more factors may be provided to a machine-learning algorithm to predict the indoor/outdoor status of the UE 630, which is an example of the UE 500. For example, historical indoor/outdoor status of the UE 630 and the present day/time may be used (possibly in combination with one or more other factors) to predict a future indoor/outdoor status of the UE 630 and a timing of the status (e.g., a time of day or a time relative to the present time). The indoor/outdoor unit 560 may thus provide a value of the timing of status field 720 to indicate a future time that the status indicated in the indoor/outdoor status field 710 will be valid. The time may be indicated in a variety of ways, e.g., an absolute time such as the time in hours, minutes, and seconds or a relative time, e.g., a number of seconds from a present time.

The indoor/outdoor unit 560 may be configured to determine and indicate a period of validity of an indoor/outdoor status of the UE 500, e.g., in the validity time of status field 730 of the message 700. For example, the processor 510 may determine that the UE 500 is indoors and is likely to remain indoors for a period of time. The determination of the period of time may depend on one or more factors, and may be determined by the processor 510 executing a machine-learning algorithm. For example, the validity time may depend on a present time of day, a day of the week, a building, a building type, and/or historical time of the UE 500 in the building or building type, etc. The validity time may, for example, be a number of hours where the UE 500 is indoors in a building where a user associated with the UE 500 works, the present day is a work day, and the present time is a start of the work day. As another example, the validity time may be a matter of minutes where the UE 500 enters a shop, with the validity time possibly varying based on the type of shop, historical data associated with the UE 500 and the shop, and/or one or more other factors (e.g., an appointment schedule in a calendar stored in the memory 530). The processor 510 may specify a determined validity time of the status in the validity time of status field 730. The value of the validity time of status field 730 indicates a time at which the indoor/outdoor status indicated in the indoor/outdoor status field 710 will expire, e.g., defaulting to an indeterminate status, absent the status being updated before expiration. The validity time may be specified in a variety of ways, e.g., a time of day or an amount of time from the present time. The validity time may be set not to expire (e.g., set to infinity), e.g., for UEs that are disposed indoors long term (e.g., UEs in a factory). Upon passage of the validity time, the corresponding status indicated by the indoor/outdoor status field 710 expires. The indoor/outdoor status of the UE 500 may default to an indeterminate state upon passage of the validity time. For example, the UE interaction unit 360 may change the indoor/outdoor status of the UE 500 to indeterminate absent receipt of another status indication.

The indoor/outdoor unit 560 may be configured to report the indoor/outdoor status of the UE 500 intermittently (e.g., at regular intervals) and/or aperiodically. For example, the indoor/outdoor unit 560 may send the message 700 with a configured periodicity. The periodicity may be indicated by, or otherwise depend on, a control message received via the interface 520, e.g., from the TRP 300 or the server 400. The periodicity may depend on the value of the validity time of status field 730 and/or a speed of the UE 500. For example, an interval between reporting may decrease as the speed of the UE 500 increases, or may be set to be about as long as the validity time (e.g., 101% of the validity time). As another example, the indoor/outdoor unit 560 may be configured to report the indoor/outdoor status of the UE 500 in response to a change in the indoor/outdoor status of the UE 500 in addition to, or instead of, periodic reporting of the indoor/outdoor status. The indoor/outdoor unit 560 may change over time between periodic reporting and triggered reporting of the indoor/outdoor status of the UE 500. For example, the indoor/outdoor unit 560 may change from periodic reporting to triggered reporting based on a validity time exceeding a threshold time, e.g., one hour.

The processor 510 may be configured to control a transmit power of the interface 520 based on the indoor/outdoor status of the UE 500. For example, the indoor/outdoor unit 560 may cause the wireless transmitter 242 to increase transmit power in response to the indoor/outdoor status of the UE 500 changing from indoor to outdoor. The indoor/outdoor unit 560 may cause the power to increase before actual change in status, e.g., in anticipation of a change. For example, the indoor/outdoor unit 560 may cause the transmit power to increase in response to the UE 500 being expected to change status from indoor to outdoor in less than a threshold amount of time, e.g., five seconds. For example, a UE 631 may increase transmit power in response to determining an expected change of indoor/outdoor status as the UE 631 approaches an exit 614 of the building 613.

The TRP 300, e.g., the UE interaction unit 360, may use information from the indoor/outdoor indication message 700 to affect operation of the UE 500 and/or interaction of one or more entities with the UE 500. The TRP 300 may affect the operation and/or interaction in response to the message 700 indicating a present or future change in indoor/outdoor status. For example, the UE interaction unit 360 may cause a handover of which base station is serving the UE 500 in response to the message 700. For example, the base station 624 may cause a handover for the UE 630 from an outdoor base station, e.g., the base station 624, to an indoor base station, e.g., the base station 621, in response to the message 700 indicating that the UE 630 will be indoors within a threshold amount of time, e.g., five seconds, e.g., based on the location and velocity of the UE 630 indicating that the change in status from outdoor to indoor will be due to the UE 630 entering the building 611. As another example, the TRP 300 may control operation of the UE 500 based on the content of the message 700. For example, the base station 622 may send a control signal to the UE 631 to increase transmit power in response to the message 700 from the UE 631 indicating an expected change in status from indoor to outdoor, e.g., within a threshold amount of time. As another example, the TRP 300 may perform beam management based on the message 700. Traditionally, a different beam (than the presently-used beam) for communicating with the UE 500 is selected by the TRP 300 in response to receiving a RACH (Random Access CHannel) communication on the different beam. The UE interaction unit 360 may, however, respond to the message 700 indicating an expected change in indoor/outdoor status of the UE 500 by switching beams. The UE interaction unit 360 may intermittently (e.g., periodically) receive reports of the highest-RSRP beams (candidate beams) from the TRP 300 received by the UE 500, and change to using the next-highest RSRP beam (relative to the presently-used beam) of the candidate beams for communicating with the UE 500. Using expected indoor/outdoor status change to affect operation of, and/or interaction with, the UE 500 in a proactive manner may avoid poor communication and/or reduce power consumption for processing received communications that may occur in traditional, reactive approaches.

Figure 8:
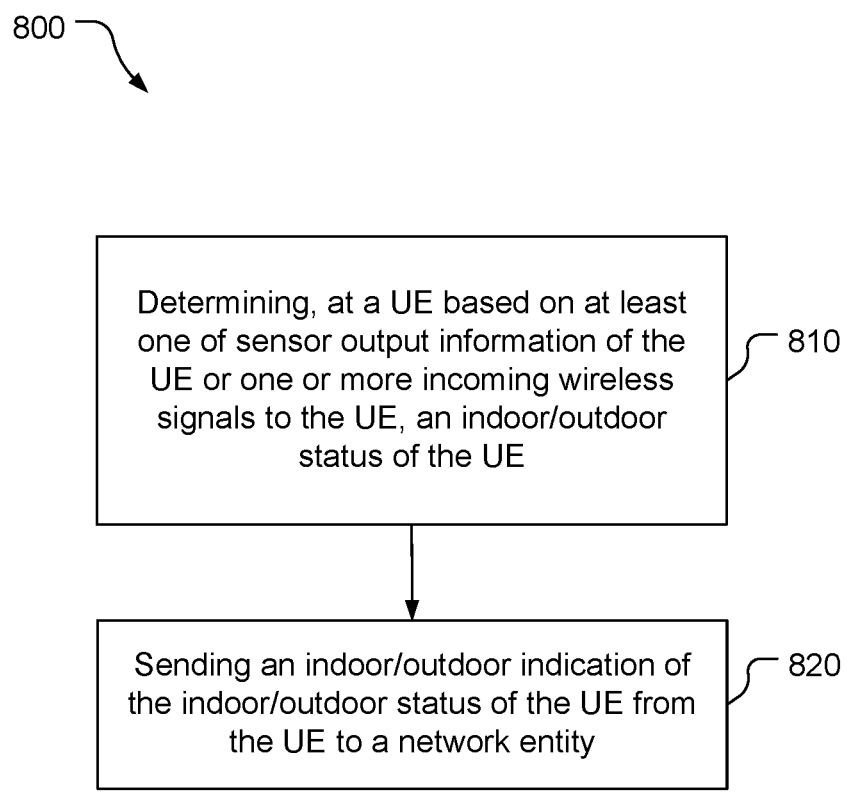
FIG. 8 is block flow diagram of a method for indicating user equipment status.
Figure 9:
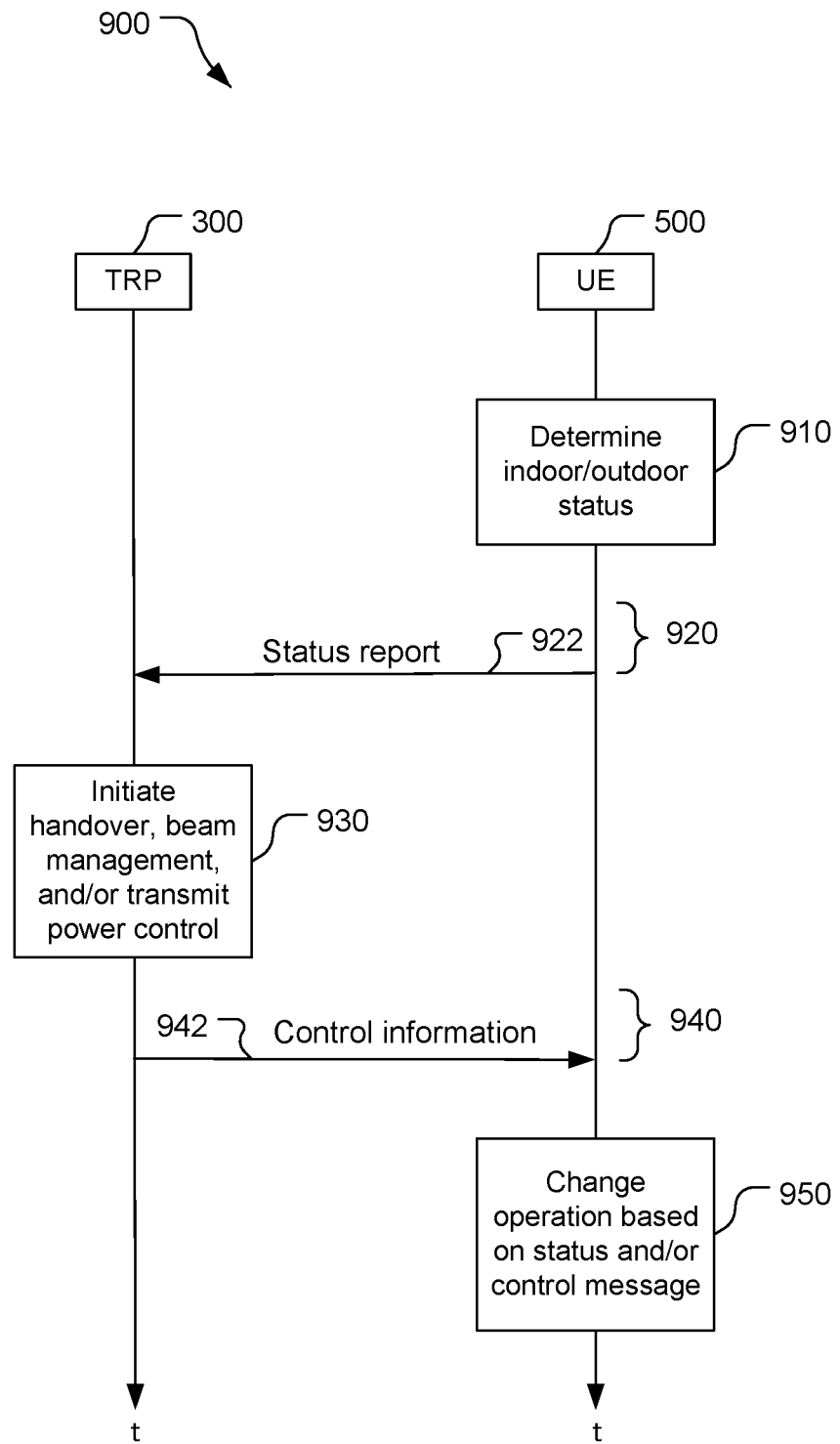
FIG. 9 is a simplified diagram of a process and signaling flow for determining and using indoor/outdoor status of a user equipment.

Referring to FIG. 8, with further reference to FIGS. 1-7 and 9, a method 800 for indicating UE status includes the stages shown. The method 800 is, however, an example only and not limiting. The method 800 may be altered, e.g., by having stages added, removed, rearranged, combined, performed concurrently, and/or having single stages split into multiple stages. FIG. 9 shows a signaling and process flow 900 for determining and using indoor/outdoor status of a UE, with the flow including the stages shown. The flow 900 may be altered, e.g., by having stages added, removed, rearranged, performed concurrently, etc.

At stage 810, the method includes determining, at the UE based on at least one of sensor output information of the UE or one or more incoming wireless signals to the UE, an indoor/outdoor status of the UE. For example, at stage 910, the indoor/outdoor unit 560 uses one or more sensor measurements and/or one or more sensor captures (e.g., image captures) and/or one or more base station signal measurements and/or one or more satellite vehicle signal measurements to determine the indoor/outdoor status of the UE 500 as discussed above, e.g., by determining a location of the UE 500 (e.g., relative to one or more indoor regions, one or more outdoor regions, one or more buildings, etc.). For example, the indoor/outdoor unit 560 may implement a machine-learning algorithm to determine (e.g., classify) the indoor/outdoor status of the UE 500 (e.g., based on a combination of sensor information and/or received signal information (e.g., measurement(s))). The indoor/outdoor unit 560 may determine the indoor/outdoor status of the UE 500 as an expected, future indoor/outdoor status, e.g., by determining position and velocity of the UE 500 in relation to one or more indoor/outdoor transitions (e.g., a building entrance/exit). The processor 510, possibly in combination with the memory 530, in combination with the interface 520 (e.g., the wireless receiver 244 and the antenna 246, and/or the SPS receiver 217 and the antenna 262) and/or the sensor(s) 540 may comprise means for determining the indoor/outdoor status of the UE 500, possibly including means for determining a position of the UE 500.

At stage 820, the method 800 includes sending an indoor/outdoor indication of the indoor/outdoor status of the UE from the UE to a network entity. For example, the indoor/outdoor unit 560 may, at stage 920, send a status report message 922 to the TRP 300 with the indoor/outdoor indication message 700. The message 700 may, for example, indicate that the indoor/outdoor status of the UE 500 is indoors, outdoors, or indeterminate. The status report message 922 may indicate an expected time of change of the indoor/outdoor status of the UE 500, e.g., may include the timing of status field 720. The status report message 922 may indicate a validity time during which the indoor/outdoor status of the UE 500. For example, the status report message 922 may include the validity time of status field 730 such that the status indicated by the indoor/outdoor status field 710 is valid for or until the indicated time, at least absent transmission by the UE 500 of another indoor/outdoor indication. That is, transmission of a subsequent indoor/outdoor indication message 700 may change the indoor/outdoor status of the UE 500 before expiration of the validity time. The processor 510, possibly in combination with the memory 530, in combination with the interface 520 (e.g., the wireless transmitter 242 and the antenna 246) may comprise means for sending the indoor/outdoor status of the UE 500.

Implementations of the method 800 may include one or more of the following features. In an example implementation, the method 800 may include determining a position of the UE based one or more received incoming wireless signals, and determining the indoor/outdoor stat of the UE may comprise determining the indoor/outdoor status of the UE based on the position of the UE. For example, the position of the UE and map information may be analyzed to determine whether the UE 500 is indoors or outdoors. In another example implementation, the indoor/outdoor indication indicates a validity time during which the indoor/outdoor status of the UE is valid absent transmission by the UE of another indoor/outdoor indication. For example, the message 700 may include the validity time of status field 730, which indicates the time of validity of the status indicated by the indoor/outdoor status field 710 unless another message is sent, overriding the previous message 700. Furthermore, in another example implementation, the indoor/outdoor status of the UE may be determined periodically in accordance with a periodicity that depends on at least one of the validity time or a speed of the UE 500. In another example implementation, the indoor/outdoor status of the UE 500 may be determined periodically in accordance with a periodicity that depends on a control message received by the UE 500. For example, control information may be sent to the UE 500 from the TRP 300 before stage 920 instructing the UE 500 to report the indoor/outdoor status periodically and indicating an interval between reports. In another example implementation, the method 800 may include controlling a transmit power of the UE based on the indoor/outdoor indication. For example, the indoor/outdoor unit 560 may increase or decrease transmit power for communications in response to a present or future change of indoor/outdoor status from indoors to outdoors or vice versa, respectively. The processor 510, possibly in combination with the memory 530, and the interface 520 (e.g., the wireless transmitter 242) may comprise means for controlling the transmit power of the UE 500. In another example implementation, the method 800 may include capturing one or more images by a camera of the UE, and determining the indoor/outdoor status based on the one or more images. The processor 510, possibly in combination with the memory 530, and the camera 218 may comprise means for capturing one or more images.

Figure 10:
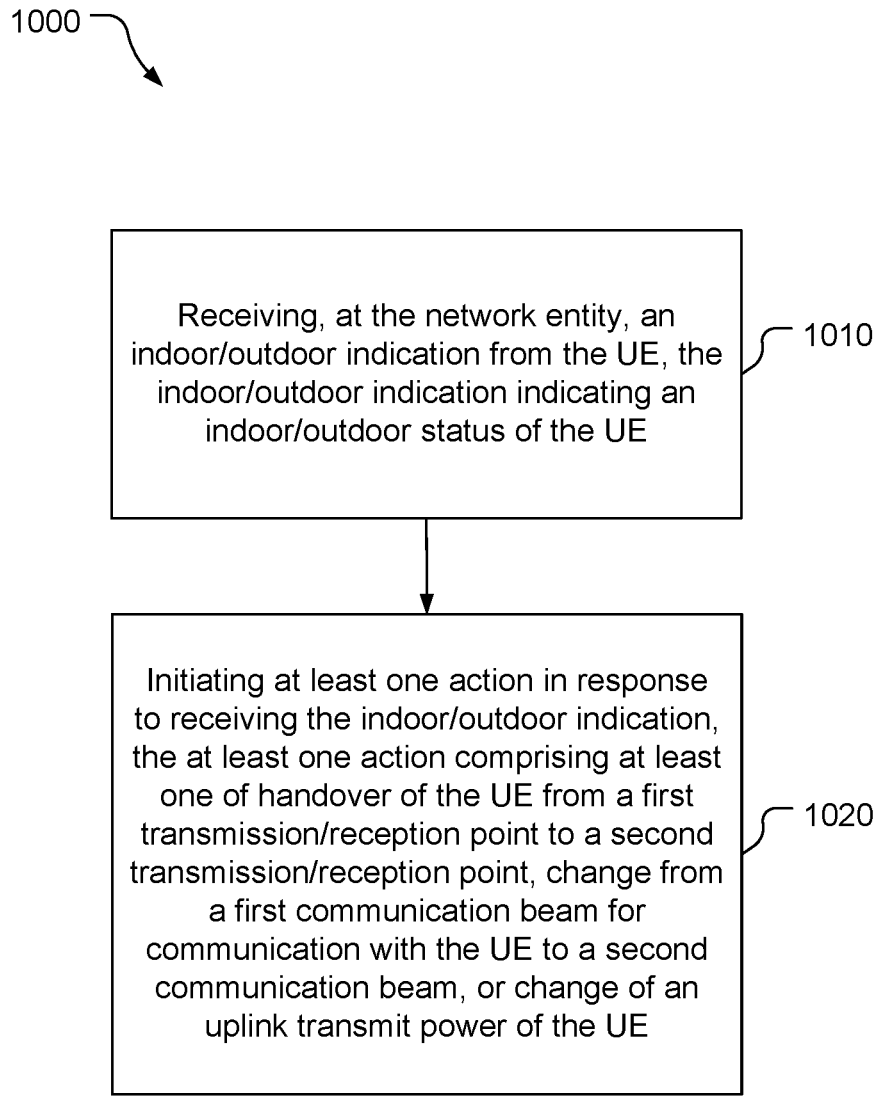
FIG. 10 is a block flow diagram of a method for responding to a user equipment status at a network entity.

Referring to FIG. 10, with further reference to FIGS. 1-7 and 9, a method 1000 of responding, at a network entity, to a UE status includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 includes receiving, at the network entity, an indoor/outdoor indication from the UE, the indoor/outdoor indication indicating an indoor/outdoor status of the UE. For example, the TRP 300 receives the status report message 922 including the indoor/outdoor indication message 700. The processor 310, possibly in combination with the memory 311, in combination with the wireless receiver 344 and the antenna 346 may comprise means for receiving the indoor/outdoor status of the UE.

At stage 1020, the method 1000 includes initiating at least one action in response to receiving the indoor/outdoor indication, the at least one action comprising at least one of handover of the UE from a first transmission/reception point to a second transmission/reception point, change from a first communication beam for communication with the UE to a second communication beam, or change of an uplink transmit power of the UE. For example, at stage 930 the TRP 300 may determine that the UE 500 is about to change from being indoors to being outdoors, or vice versa, and to initiate handover to an appropriate base station, or to initiate a command to the UE 500 to change the transmit power of the UE 500 for communications. As another example, at stage 930 the TRP 300 may determine to change beams for communicating with the UE 500 based on an expected change in indoor/outdoor status. The at least one action may be initiated in response to the indoor/outdoor indication indicating an actual or expected change in the indoor/outdoor status of the UE 500. For example, the at least one action may be changing communication beams from the first communication beam to the second communication beam, and the change may be initiated without the network entity receiving a communication from the UE through the second communication beam (e.g., without receiving a RACH on the second communication beam as part of a beam failure recovery procedure). The processor 310, possibly in combination with the memory 311, and possibly in combination with the wireless transmitter 342 and the antenna 346 may comprise means for initiating the at least one action.

As part of the at least one action, the TRP 300 may send a control information message 942 to the UE 500 at stage 940. The control information may include, for example, handover information for the UE 500 to change from the TRP 300 to another TRP as the serving TRP, to change the beam that the UE 500 uses for communication with the TRP 300, and/or to change a transmit power of the UE 500 for communication. The UE 500 may, at stage 950, change operation in response to the control information message 942, e.g., using a different TRP as the serving TRP, using a different beam for communication with the TRP 300, and/or changing a transmit power of the UE 500.

IMPLEMENTATION EXAMPLES

Implementation examples are provided in the following numbered clauses.

Clause 1. A user equipment (UE) comprising: a transmitter; at least one of: a receiver configured to receive incoming wireless signals or a sensor configured to provide sensor output information; a memory; and a processor communicatively coupled to the transmitter, to the at least one of the receiver or the sensor, and to the memory, wherein the processor is configured to: determine, based on at least one of the sensor output information or one or more of the incoming wireless signals, an indoor/outdoor status of the UE; and send, via the transmitter, an indoor/outdoor indication of the indoor/outdoor status of the UE.

Clause 2. The UE of clause 1, wherein the indoor/outdoor status of the UE is an expected, future indoor/outdoor status of the UE.

Clause 3. The UE of clause 1, wherein the indoor/outdoor indication indicates an expected time of a change in the indoor/outdoor status of the UE.

Clause 4. The UE of clause 1, wherein to determine the indoor/outdoor status of the UE the processor is configured to implement a machine-learning algorithm.

Clause 5. The UE of clause 1, wherein the UE comprises the receiver, the processor is configured to determine a position of the UE based on one or more of the incoming wireless signals, and wherein the processor is configured to determine the indoor/outdoor status of the UE based on the position of the UE.

Clause 6. The UE of clause 1, wherein the indoor/outdoor indication indicates a validity time during which the indoor/outdoor status of the UE is valid absent transmission by the UE of another indoor/outdoor indication.

Clause 7. The UE of clause 6, wherein the processor is configured to determine the indoor/outdoor status of the UE periodically in accordance with a periodicity that depends on at least one of the validity time or a speed of the UE.

Clause 8. The UE of clause 1, wherein the UE comprises the receiver and wherein the processor is configured to determine the indoor/outdoor status of the UE periodically in accordance with a periodicity that depends on a control message received via the receiver.

Clause 9. The UE of clause 1, wherein the processor is configured to control a transmit power of the transmitter based on the indoor/outdoor indication.

Clause 10. The UE of clause 1, wherein the UE comprises the sensor, wherein the sensor comprises a camera, and wherein the processor is configured to determine the indoor/outdoor status based on one or more images captured by the camera.

Clause 11. The UE of clause 1, wherein the indoor/outdoor indication indicates that the indoor/outdoor status of the UE is indoors, outdoors, or indeterminate.

Clause 12. A method of indicating user equipment (UE) status, the method comprising: determining, at the UE based on at least one of sensor output information of the UE or one or more incoming wireless signals to the UE, an indoor/outdoor status of the UE; and sending an indoor/outdoor indication of the indoor/outdoor status of the UE from the UE to a network entity.

Clause 13. The method of clause 12, wherein the indoor/outdoor status of the UE is an expected, future indoor/outdoor status of the UE.

Clause 14. The method of clause 12, wherein the indoor/outdoor indication indicates an expected time of a change in the indoor/outdoor status of the UE.

Clause 15. The method of clause 12, wherein determining the indoor/outdoor status of the UE comprises implementing a machine-learning algorithm.

Clause 16. The method of clause 12, further comprising determining a position of the UE based on one or more received incoming wireless signals, and wherein determining the indoor/outdoor status of the UE comprises determining the indoor/outdoor status of the UE based on the position of the UE.

Clause 17. The method of clause 12, wherein the indoor/outdoor indication indicates a validity time during which the indoor/outdoor status of the UE is valid absent transmission by the UE of another indoor/outdoor indication.

Clause 18. The method of clause 17, wherein the indoor/outdoor status of the UE is determined periodically in accordance with a periodicity that depends on at least one of the validity time or a speed of the UE.

Clause 19. The method of clause 12, wherein the indoor/outdoor status of the UE is determined periodically in accordance with a periodicity that depends on a control message received by the UE.

Clause 20. The method of clause 12, further comprising controlling a transmit power of the UE based on the indoor/outdoor indication.

Clause 21. The method of clause 12, further comprising capturing one or more images by a camera of the UE, wherein the indoor/outdoor status is determined based on the one or more images.

Clause 22. The method of clause 12, wherein the indoor/outdoor indication indicates that the indoor/outdoor status of the UE is indoors, outdoors, or indeterminate.

Clause 23. A user equipment (UE) comprising: determining means for determining, based on at least one of sensor output information or one or more incoming wireless signals, an indoor/outdoor status of the UE; and means for sending an indoor/outdoor indication of the indoor/outdoor status of the UE to a network entity.

Clause 24. The UE of clause 23, wherein the indoor/outdoor status of the UE is an expected, future indoor/outdoor status of the UE.

Clause 25. The UE of clause 23, wherein the indoor/outdoor indication indicates an expected time of a change in the indoor/outdoor status of the UE.

Clause 26. The UE of clause 23, wherein the determining means comprise means for implementing a machine-learning algorithm.

Clause 27. The UE of clause 23, further comprising means for determining a position of the UE based on one or more received incoming wireless signals, and wherein the determining means comprise means for determining the indoor/outdoor status of the UE based on the position of the UE.

Clause 28. The UE of clause 23, wherein the indoor/outdoor indication indicates a validity time during which the indoor/outdoor status of the UE is valid absent transmission by the UE of another indoor/outdoor indication.

Clause 29. The UE of clause 28, wherein the determining means comprise means for determining the indoor/outdoor status of the UE periodically in accordance with a periodicity that depends on at least one of the validity time or a speed of the UE.

Clause 30. The UE of clause 23, wherein the determining means comprise means for determining the indoor/outdoor status of the UE periodically in accordance with a periodicity that depends on a control message received by the UE.

Clause 31. The UE of clause 23, further comprising means for controlling a transmit power of the UE based on the indoor/outdoor indication.

Clause 32. The UE of clause 23, wherein the determining means comprise means for capturing one or more images and means for determining the indoor/outdoor status based on the one or more images.

Clause 33. The UE of clause 23, wherein the indoor/outdoor indication indicates that the indoor/outdoor status of the UE is indoors, outdoors, or indeterminate.

Clause 34. A non-transitory, processor-readable storage medium comprising processor-readable instructions configured to cause a processor of a user equipment (UE), in order to indicate a status of the UE, to: determine, based on at least one of sensor output information of the UE or one or more incoming wireless signals to the UE, an indoor/outdoor status of the UE; and send an indoor/outdoor indication of the indoor/outdoor status of the UE to a network entity.

Clause 35. The storage medium of clause 34, wherein the indoor/outdoor status of the UE is an expected, future indoor/outdoor status of the UE.

Clause 36. The storage medium of clause 34, wherein the indoor/outdoor indication indicates an expected time of a change in the indoor/outdoor status of the UE.

Clause 37. The storage medium of clause 34, wherein the processor-readable instructions configured to cause the processor to determine the indoor/outdoor status of the UE comprise processor-readable instructions configured to cause the processor to implement a machine-learning algorithm.

Clause 38. The storage medium of clause 34, further comprising processor-readable instructions configured to cause the processor to determine a position of the UE based on one or more received incoming wireless signals, wherein the processor-readable instructions configured to cause the processor to determine the indoor/outdoor status of the UE comprise processor-readable instructions configured to cause the processor to determine the indoor/outdoor status of the UE based on the position of the UE.

Clause 39. The storage medium of clause 34, wherein the indoor/outdoor indication indicates a validity time during which the indoor/outdoor status of the UE is valid absent transmission by the UE of another indoor/outdoor indication.

Clause 40. The storage medium of clause 39, wherein the processor-readable instructions configured to cause the processor to determine the indoor/outdoor status of the UE comprise processor-readable instructions configured to cause the processor to determine the indoor/outdoor status of the UE periodically in accordance with a periodicity that depends on at least one of the validity time or a speed of the UE.

Clause 41. The storage medium of clause 34, wherein the processor-readable instructions configured to cause the processor to determine the indoor/outdoor status of the UE comprise processor-readable instructions configured to cause the processor to determine the indoor/outdoor status of the UE periodically in accordance with a periodicity that depends on a control message received by the UE.

Clause 42. The storage medium of clause 34, further comprising instructions configured to cause the processor to control a transmit power of the UE based on the indoor/outdoor indication.

Clause 43. The storage medium of clause 34, wherein the processor-readable instructions configured to cause the processor to determine the indoor/outdoor status of the UE comprise processor-readable instructions configured to cause the processor to determine the indoor/outdoor status based on one or more images captured by a camera of the UE.

Clause 44. The storage medium of clause 34, wherein the indoor/outdoor indication indicates that the indoor/outdoor status of the UE is indoors, outdoors, or indeterminate.

Clause 45. A network entity comprising: a transceiver; a memory; and a processor, communicatively coupled to the transceiver and the memory, configured to: receive an indoor/outdoor indication from a user equipment (UE) via the transceiver, the indoor/outdoor indication indicating an indoor/outdoor status of the UE; and initiate at least one action in response to receiving the indoor/outdoor indication, the at least one action comprising at least one of handover of the UE from a first transmission/reception point to a second transmission/reception point, change from a first communication beam for communication with the UE to a second communication beam, or change of an uplink transmit power of the UE.

Clause 46. The network entity of clause 45, wherein the processor is configured to initiate the at least one action in response to the indoor/outdoor indication indicating a change in the indoor/outdoor status of the UE.

Clause 47. The network entity of clause 46, wherein the processor is configured to initiate the at least one action in response to the indoor/outdoor indication indicating an expected change in the indoor/outdoor status of the UE.

Clause 48. The network entity of clause 47, wherein the processor is configured to initiate the change from the first communication beam to the second communication beam without receiving a communication from the UE through the second communication beam.

Clause 49. A network entity comprising: means for receiving an indoor/outdoor indication from a user equipment (UE), the indoor/outdoor indication indicating an indoor/outdoor status of the UE; and initiating means for initiating at least one action in response to receiving the indoor/outdoor indication, the at least one action comprising at least one of handover of the UE from a first transmission/reception point to a second transmission/reception point, change from a first communication beam for communication with the UE to a second communication beam, or change of an uplink transmit power of the UE.

Clause 50. The network entity of clause 49, wherein the initiating means are for initiating the at least one action in response to the indoor/outdoor indication indicating a change in the indoor/outdoor status of the UE.

Clause 51. The network entity of clause 50, wherein the initiating means are for initiating the at least one action in response to the indoor/outdoor indication indicating an expected change in the indoor/outdoor status of the UE.

Clause 52. The network entity of clause 51, wherein the initiating means are for initiating the change from the first communication beam to the second communication beam without receiving a communication from the UE through the second communication beam.

Clause 53. A method of responding, at a network entity, to a user equipment (UE) status, the method comprising: receiving, at the network entity, an indoor/outdoor indication from the UE, the indoor/outdoor indication indicating an indoor/outdoor status of the UE; and initiating at least one action in response to receiving the indoor/outdoor indication, the at least one action comprising at least one of handover of the UE from a first transmission/reception point to a second transmission/reception point, change from a first communication beam for communication with the UE to a second communication beam, or change of an uplink transmit power of the UE.

Clause 54. The method of clause 53, wherein the at least one action is initiated in response to the indoor/outdoor indication indicating a change in the indoor/outdoor status of the UE.

Clause 55. The method of clause 54, wherein the at least one action is initiated in response to the indoor/outdoor indication indicating an expected change in the indoor/outdoor status of the UE.

Clause 56. The method of clause 55, wherein the at least one action comprises the change from the first communication beam to the second communication beam, and wherein the change from the first communication beam to the second communication beam is initiated without receiving a communication at the network entity from the UE through the second communication beam.

Clause 57. A non-transitory, processor-readable storage medium comprising processor-readable instructions configured to cause a processor, in order to affect operation of a network entity, to: receive an indoor/outdoor indication from a user equipment (UE), the indoor/outdoor indication indicating an indoor/outdoor status of the UE; and initiate at least one action in response to receiving the indoor/outdoor indication, the at least one action comprising at least one of handover of the UE from a first transmission/reception point to a second transmission/reception point, change from a first communication beam for communication with the UE to a second communication beam, or change of an uplink transmit power of the UE.

Clause 58. The storage medium of clause 57, wherein the processor-readable instructions configured to cause the processor to initiate the at least one action comprise processor-readable instructions configured to cause the processor to initiate the at least one action in response to the indoor/outdoor indication indicating a change in the indoor/outdoor status of the UE.

Clause 59. The storage medium of clause 58, wherein the processor-readable instructions configured to cause the processor to initiate the at least one action comprise processor-readable instructions configured to cause the processor to initiate the at least one action in response to the indoor/outdoor indication indicating an expected change in the indoor/outdoor status of the UE.

Clause 60. The storage medium of clause 59, wherein the at least one action comprises the change from the first communication beam to the second communication beam, and wherein the processor-readable instructions configured to cause the processor to change from the first communication beam to the second communication beam comprise processor-readable instructions configured to cause the processor to change from the first communication beam to the second communication beam without the network entity receiving a communication from the UE through the second communication beam.

Clause 61. A user equipment (UE) comprising: at least one transmitter; at least one of: at least one receiver configured to receive incoming wireless signals or at least one sensor configured to provide sensor output information; at least one memory; and at least one processor communicatively coupled to the at least one transmitter, to the at least one of the at least one receiver or the at least one sensor, and to the at least one memory, wherein the at least one processor is configured to: determine, based on at least one of the sensor output information or one or more of the incoming wireless signals, an indoor/outdoor status of the UE; transmit, via the at least one transmitter, an indoor/outdoor indication message to a network entity, wherein the indoor/outdoor indication message reports the indoor/outdoor status of the UE to the network entity, and the network entity is a base station, or a server, or both; receive, via the at least one receiver, a control information message from the network entity in response to the indoor/outdoor indication message; and change operation of the UE based on the control information message.

Clause 62. The UE of clause 61, wherein the indoor/outdoor indication message includes an indoor/outdoor status field, a timing of status field, and a validity of status field, and the indoor/outdoor status of the UE is an expected, future indoor/outdoor status of the UE.

Clause 63. The UE of clause 61, wherein the indoor/outdoor indication message indicates an expected time of a change in the indoor/outdoor status of the UE.

Clause 64. The UE of clause 61, wherein to determine the indoor/outdoor status of the UE the at least one processor is configured to implement a machine-learning algorithm.

Clause 65. The UE of clause 61, wherein the at least one processor is configured to determine a position of the UE based on one or more of the incoming wireless signals, and determine the indoor/outdoor status of the UE based on the position of the UE.

Clause 66. The UE of clause 61, wherein the indoor/outdoor indication message indicates a validity time during which the indoor/outdoor status of the UE is valid absent transmission by the UE of another indoor/outdoor indication message reporting another indoor/outdoor indication message, and the at least one processor is configured to determine the indoor/outdoor status of the UE periodically in accordance with a periodicity that depends on at least one of the validity time or a speed of the UE.

Clause 67. The UE of clause 61, wherein the UE comprises the at least one receiver and wherein the at least one processor is configured to determine the indoor/outdoor status of the UE periodically in accordance with a periodicity that depends on a control message received via the at least one receiver.

Clause 68. The UE of clause 61, wherein the at least one processor is configured to control a transmit power of the at least one transmitter based on the indoor/outdoor indication message.

Clause 69. The UE of clause 61, wherein the UE comprises the at least one sensor, wherein the at least one sensor comprises a camera, and the at least one processor is configured to determine the indoor/outdoor status based on one or more images captured by the camera.

Clause 70. The UE of clause 61, wherein the indoor/outdoor indication message indicates that the indoor/outdoor status of the UE is indoors, outdoors, or indeterminate.

Clause 71. A method of indicating user equipment (UE) status, the method comprising: determining, at the UE based on at least one of sensor output information of the UE or one or more incoming wireless signals to the UE, an indoor/outdoor status of the UE; transmit, via at least one transmitter, an indoor/outdoor indication message to a network entity, wherein the indoor/outdoor indication message reports the indoor/outdoor status of the UE to the network entity, and the network entity is a base station, or a server, or both; receiving, via at least one receiver, a control information message from the network entity in response to the indoor/outdoor indication message; and changing operation of the UE based on the control information message.

Clause 72. The method of clause 71, wherein the indoor/outdoor indication message includes an indoor/outdoor status field, a timing of status field, and a validity of status field, and the indoor/outdoor status of the UE is an expected, future indoor/outdoor status of the UE.

Clause 73. The method of clause 71, wherein the indoor/outdoor indication message indicates an expected time of a change in the indoor/outdoor status of the UE.

Clause 74. The method of clause 71, further comprising determining a position of the UE based on one or more received incoming wireless signals, and wherein determining the indoor/outdoor status of the UE comprises determining the indoor/outdoor status of the UE based on the position of the UE.

Clause 75. The method of clause 71, wherein the indoor/outdoor indication message indicates a validity time during which the indoor/outdoor status of the UE is valid absent transmission by the UE of another indoor/outdoor indication message, and the indoor/outdoor status of the UE is determined periodically in accordance with a periodicity that depends on at least one of the validity time or a speed of the UE.

Clause 76. The method of clause 71, wherein the indoor/outdoor status of the UE is determined periodically in accordance with a periodicity that depends on a control message received by the UE.

Clause 77. The method of clause 71, further comprising controlling a transmit power of the UE based on the indoor/outdoor indication message.

Clause 78. The method of clause 71, further comprising capturing one or more images by a camera of the UE, wherein the indoor/outdoor status is determined based on the one or more images.

Clause 79. The method of clause 71, wherein the indoor/outdoor indication message indicates that the indoor/outdoor status of the UE is indoors, outdoors, or indeterminate.

Clause 80. A user equipment (UE) comprising: means for determining, based on at least one of sensor output information or one or more incoming wireless signals, an indoor/outdoor status of the UE; means for reporting an indoor/outdoor indication of the indoor/outdoor status of the UE to a network entity, wherein the network entity is a base station, or a server, or both; means for receiving a control information message from the network entity in response to the indoor/outdoor indication; and means for changing operation of the UE based on the control information message.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
   at least one transmitter;
   at least one of: at least one receiver configured to receive incoming wireless signals or at least one sensor configured to provide sensor output information;
   at least one memory; and
   at least one processor communicatively coupled to the at least one transmitter, to the at least one of the at least one receiver or the at least one sensor, and to the at least one memory, wherein the at least one processor is configured to:
   determine, based on at least one of the sensor output information or one or more of the incoming wireless signals, an indoor or outdoor status of the UE;
   transmit, via the at least one transmitter, an indoor or outdoor indication
   message to a network entity, wherein
   the indoor or outdoor indication message reports the indoor or outdoor status of the UE to the network entity, and
   the network entity is a base station, or a server, or both;
   receive, via the at least one receiver, a control information message from the network entity in response to the indoor or outdoor indication message; and
   change operation of the UE based on the control information message.

2. The UE of claim 1, wherein
   the indoor or outdoor indication message includes
   an indoor or outdoor status field,
   a timing of status field, and
   a validity of status field, and
   the indoor or outdoor status of the UE is an expected, future indoor or outdoor status of the UE.

3. The UE of claim 1, wherein the indoor or outdoor indication message indicates an expected time of a change in the indoor or outdoor status of the UE.

4. The UE of claim 1, wherein to determine the indoor or outdoor status of the UE the at least one processor is configured to implement a machine-learning algorithm.

5. The UE of claim 1, wherein the at least one processor is configured to
   determine a position of the UE based on one or more of the incoming wireless signals, and
   determine the indoor or outdoor status of the UE based on the position of the UE.

6. The UE of claim 1, wherein
   the indoor or outdoor indication message indicates a validity time during which the indoor or outdoor status of the UE is valid absent transmission by the UE of another indoor or outdoor indication message reporting another indoor or outdoor indication message, and
   the at least one processor is configured to determine the indoor or outdoor status of the UE periodically in accordance with a periodicity that depends on at least one of the validity time or a speed of the UE.

7. The UE of claim 1, wherein the UE comprises the at least one receiver and wherein the at least one processor is configured to determine the indoor or outdoor status of the UE periodically in accordance with a periodicity that depends on a control message received via the at least one receiver.

8. The UE of claim 1, wherein the at least one processor is configured to control a transmit power of the at least one transmitter based on the indoor or outdoor indication message.

9. The UE of claim 1, wherein the UE comprises the at least one sensor, wherein the at least one sensor comprises a camera, and the at least one processor is configured to determine the indoor or outdoor status based on one or more images captured by the camera.

10. The UE of claim 1, wherein the indoor or outdoor indication message indicates that the indoor or outdoor status of the UE is indoors, outdoors, or indeterminate.

11. A method of indicating user equipment (UE) status, the method comprising:

determining, at the UE based on at least one of sensor output information of the UE or one or more incoming wireless signals to the UE, an indoor or outdoor status of the UE;

transmit, via at least one transmitter, an indoor or outdoor indication message to a network entity, wherein the indoor or outdoor indication message reports the indoor or outdoor status of the UE to the network entity, and the network entity is a base station, or a server, or both;

receiving, via at least one receiver, a control information message from the network entity in response to the indoor or outdoor indication message; and changing operation of the UE based on the control information message.

12. The method of claim 11, wherein the indoor or outdoor indication message includes an indoor or outdoor status field, a timing of status field, and a validity of status field, and the indoor or outdoor status of the UE is an expected, future indoor or outdoor status of the UE.

13. The method of claim 11, wherein the indoor or outdoor indication message indicates an expected time of a change in the indoor or outdoor status of the UE.

14. The method of claim 11, further comprising determining a position of the UE based on one or more received incoming wireless signals, and wherein determining the indoor or outdoor status of the UE comprises determining the indoor or outdoor status of the UE based on the position of the UE.

15. The method of claim 11, wherein the indoor or outdoor indication message indicates a validity time during which the indoor or outdoor status of the UE is valid absent transmission by the UE of another indoor or outdoor indication message, and the indoor or outdoor status of the UE is determined periodically in accordance with a periodicity that depends on at least one of the validity time or a speed of the UE.

16. The method of claim 11, wherein the indoor or outdoor status of the UE is determined periodically in accordance with a periodicity that depends on a control message received by the UE.

17. The method of claim 11, further comprising controlling a transmit power of the UE based on the indoor or outdoor indication message.

18. The method of claim 11, further comprising capturing one or more images by a camera of the UE, wherein the indoor or outdoor status is determined based on the one or more images.

19. The method of claim 11, wherein the indoor or outdoor indication message indicates that the indoor or outdoor status of the UE is indoors, outdoors, or indeterminate.

20. A user equipment (UE) comprising:

means for determining, based on at least one of sensor output information or one or more incoming wireless signals, an indoor or outdoor status of the UE;

means for reporting an indoor or outdoor indication of the indoor or outdoor status of the UE to a network entity, wherein the network entity is a base station, or a server, or both;

means for receiving a control information message from the network entity in response to the indoor or outdoor indication; and means for changing operation of the UE based on the control information message.

* * * * *